2,750,259

METHOD OF PRODUCING TITANIUM MONOXIDE

Morris A. Steinberg, Shaker Heights, and Eugene Wainer, Cleveland Heights, Ohio, assignors, by mesne assignments, to Horizons Titanium Corporation, Princeton, N. J., a corporation of New Jersey No Drawing. Application July 21, 1953, Serial No. 369,511

6 Claims. (Cl. 23—202)

This invention relates to the production of titanium monoxide and more particularly to a method of producing substantially pure titanium monoxide from titanium dioxide.

Titanium monoxide, which until recently has been little more than a laboratory curiosity, has been found to be useful for a variety of purposes that promise to greatly enhance the commercial importance of this material. For example, titanium monoxide may be used as a starting material in an electrolytic procedure for the preparation of titanium metal, or as a semi-conductor in the electronic art. The usefulness of titanium monoxide for these purposes, however, depends largely upon the degree of purity of the monoxide and its freedom from contamination with higher oxides of titanium. It is to the production of titanium monoxide substantially free from higher oxides of titanium that our invention is directed.

Both naturally occurring and chemically prepared titanium dioxide are commercially available in large quantities. It has, therefore, been proposed heretofore that titanium monoxide be produced by the reduction of titanium dioxide with carbon or other reducing agents. The known procedures for the reduction of titanium dioxide with carbon, however, do not produce a titanium monoxide product of a degree of purity suitable for the purposes hereinbefore mentioned. In an effort to determine the conditions which would lead to the production of a titanium monoxide product of satisfactory quality, we have conducted an extensive investigation of the reactions that take place when titanium dioxide and carbon are heated together at elevated temperatures. Our investigations have led us to the discovery that the reduction of titanium dioxide proceeds through certain well-defined stages and that each stage of the reduction proceeds efficiently within certain temperature ranges. We have found, moreover, that the reactions in each of these stages are reversible in the presence of carbon monoxide, and that, unless the reactions between carbon monoxide and the lower oxides of titanium are prevented, mixtures of oxides of titanium in unpredictable proportions will be found in the ultimate reaction product. Therefore, in order to avoid the reversal of the primary reactions, we have found it necessary to maintain the sphere of the reaction substantially free from carbon monoxide under the conditions described herein.

The reduction of titanium dioxide to titanium monoxide pursuant to the method of our invention proceeds through two reaction stages, the first of which involves the reduction of titanium dioxide with carbon to produce titanium sesquioxide under conditions which avoid the formation of other oxides of titanium, and the second of which involves the reduction of the titanium sesquioxide with carbon to produce the desired titanium monoxide substantially uncontaminated with other titanium oxides. The titanium dioxide is reduced to the sesquioxide by forming an intimate mixture of titanium dioxide with at least one-half mol but not more than one mol of elemental carbon per mol of titanium dioxide. The mixture is heated to a reaction temperature within the range of about 1100° to 1200° C. and the carbon monoxide evolved from the mixture is removed from the reaction zone. The reaction temperature is maintained within said range until said evolution of carbon monoxide substantially ceases with the result that titanium sesquioxide is formed substantially free from other oxides of titanium. Thereafter, an intimate mixture of the resulting titanium sesquioxide with an equimolar quantity of elemental carbon is heated to a reaction temperature within the range of about 1500° to 1800° C. and evolved carbon monoxide is again removed from the reaction zone. The reaction temperature is maintained within said range until the evolution of carbon monoxide substantially ceases, whereupon the resulting titanium monoxide product is recovered.

The titanium dioxide used in practicing our invention should be of high purity in order to obtain a titanium monoxide product of satisfactory quality without further troublesome purification procedures being required. However, naturally occurring sources of the dioxide, such as rutile or ilmenite, which have been placed in substantially pure form by conventional methods of beneficiation, may be used as the starting material. When ilmenite (a titaniferous iron ore) is used, the titanium monoxide product contains substantial quantities of metallic iron which must be separated therefrom. This may be accomplished by crushing the reaction product to minus 325 mesh (Tyler standard) so that the metallic iron may be separated by means of magnetic separators. We prefer, however, to use pigment grade titanium dioxide as the starting material so that the titanium monoxide which is produced will require no further chemical or physical treatment to place it in useful condition.

The carbon which is used to reduce the titanium dioxide to titanium sesquioxide, and that which is used to reduce the titanium sesquioxide to the desired titanium monoxide product, should be as pure as it is possible to obtain. We prefer a pure form of carbon such as lampblack or petroleum coke having a particle size of minus 325 mesh (Tyler standard), both advantageously further purified by calcination in a neutral atmosphere to a temperature of at least 2500° F. (1371° C.) Calcination of the carbon at this temperature removes substantially all of the residual volatile constituents and results in a product having a carbon content of at least 99% elemental carbon which is eminently suited for separately reducing the titanium dioxide and the titanium sesquioxide in accordance with our invention.

Finely divided elemental carbon and titanium dioxide are intimately mixed together to form the initial reaction mixture of our invention. For each mol of titanium dioxide present in the initial mixture, there must be at least one-half mol of elemental carbon in order to completely reduce the dioxide to an equivalent quantity of titanium sesquioxide. Titanium sesquioxide does not react with carbon to any significant extent at the temperatures reached during the first stage of our process, that is, at temperatures within the range of about 1100° to 1200° C. It is possible, therefore, to incorporate in the initial reaction mixture an additional amount of carbon beyond that which is sufficient to convert the titanium dioxide to titanium sesquioxide. Such additional carbon is intimately mixed with the sesquioxide product and is available for reaction therewith in the second stage of our process.

In the second stage, an intimate mixture of elemental carbon and titanium sesquioxide in equimolar proportions are heated together to produce the desired titanium monoxide product. If the molar proportion of carbon to titanium sesquioxide in the second stage reaction mixture exceeds 1:1, there will be present in the mixture an amount of carbon in excess of that required to convert all of the sesquioxide to titanium monoxide. Such excess of carbon will react with the titanium oxides in the mixture to produce titanium carbide which, for many purposes, is an undesirable contaminant in high purity titanium monoxide. Care should be taken, therefore, to avoid the presence in the second stage reaction mixture of such an excess of elemental carbon. The carbon required for the second stage may be incorporated in the initial reaction mixture, or it may be added separately to the sesquioxide product of the first stage. If it is incorporated in the initial reaction mixture, there should be present in the mixture one mol of carbon for each mol of titanium dioxide. The reaction product of the first stage will then contain one-half mol of unconsumed carbon for each one-half mol of titanium sesquioxide produced. The unconsumed carbon and the sesquioxide are thus present in equimolar proportions and may, therefore, be reacted without further modification to form titanium monoxide pursuant to our invention. If the initial reaction mixture contains less than one mol but, of course, at least one-half mol of carbon, the sesquioxide product of the first stage will not contain sufficient carbon to convert all of the sesquioxide to titanium monoxide. In such case, therefore, it is necessary to incorporate in the sesquioxide product additional elemental carbon in order to form an equimolar mixture of carbon and titanium sesquioxide for reaction in the second stage.

The reaction between titanium sesquioxide and carbon with the resulting formation of titanium monoxide takes place in the solid state at a reaction temperature within the range of about 1500° to 1800° C., and preferably within the range of about 1700° to 1750° C. As hereinbefore pointed out, the reaction results in the formation and evolution of carbon monoxide which should be removed from the reaction zone substantially as rapidly as it is formed to prevent reaction between the carbon monoxide and the titanium monoxide product. When the reaction is carried out in the solid state, the carbon monoxide evolves freely from the reaction mixture and may be removed from the reaction zone without difficulty. However, should the temperature of the reaction mixture become high enough to cause partial or complete fusion of the reaction mixture, the evolved carbon monoxide tends to dissolve in or become combined with the fused reaction product and to be retained in this product as a deleterious contaminant. By maintaining the temperature of the reactants and the reaction product below about 1800° C. until the reaction is complete and the evolution of carbon monoxide has substantially ceased, the desired titanium monoxide will be formed in the solid state and a reaction product will be obtained which is free from dissolved or combined carbon monoxide.

The successive reduction of titanium dioxide to titanium sesquioxide and of titanium sesquioxide to titanium monoxide with elemental carbon is advantageously carried out in a container such as a graphite crucible. The reactants should not be permitted to come into contact with extraneous carbon or, for that matter, with any other material which might adversely affect the purity of the reaction product. Therefore, when a graphite crucible is used as a container for the reactants, the inside of the container in contact with the reactants should be lined with a material such as molybdenum which is substantially inert to the reaction mixture up to the maximum temperature of 1800° C. Fortunately, however, the finely divided reactants tend to shrink as the temperature is raised above about 800° C. and the mass thus withdraws from contact with the side and top walls of the furnace. Ordinarily, therefore, it is necessary to line only the bottom of such a graphite container with sheet molybdenum.

The container in which the reaction mixture is received is placed within a suitable furnace provided with facilities for controlling its atmosphere and temperature. The furnace should be equipped with auxiliary apparatus to permit the maintenance of an inert atmosphere therein. Such auxiliary apparatus may comprise means for continuously sweeping the interior of the furnace with an inert gas such as argon or the like, or, preferably, it may comprise a vacuum pump connected to the furnace for continuously removing substantially all gas therefrom. Electric furnaces, such as electric resistance or induction furnaces equipped with a high speed vacuum pump, are particularly advantageous for carrying out the method of producing titanium monoxide in accordance with our invention.

In the preferred practice of our invention, the initial reactants comprise an intimate mixture of finely divided pigment grade titanium dioxide and substantially pure carbon having a particle size of minus 325 mesh (Tyler standard). The reactants may, if desired, be briquetted but ordinarily it is sufficient merely to tamp the reaction mixture into the reaction vessel. In the latter case, holes are advantageously formed in the tamped mass to allow evolved gases to escape therefrom. After the charge of reactants has been placed in the reaction vessel, an inert atmosphere is established therein, preferably by means of a high speed vacuum pump capable of lowering the pressure within the vessel to below about 100 microns of mercury by evacuating substantially all gas therefrom. When the pressure within the vessel has been reduced below about 100 microns, the heating of the charge is commenced and its temperature is raised until it is within the range of about 1100° to 1200° C. Active vacuum pumping is continued and the temperature is maintained within the range of 1100° to 1200° C. The reaction between the titanium dioxide and carbon proceeds quite rapidly within this temperature range and is accompanied by the evolution of carbon monoxide that continues until the reaction is complete. Although the carbon monoxide evolved from the reaction mixture is removed from the reaction zone by means of the active vacuum pumping substantially as soon as it is formed, it nevertheless causes an appreciable rise in pressure within the reaction vessel, the magnitude of the pressure rise being determined by the capacity of the vacuum pump employed. The completion of the reaction is thus indicated externally by a drop in pressure within the reaction vessel, but, to insure uniform heating of the reactants and substantial completion of the reaction, the reaction temperature should be maintained within the specified range for at least 45 minutes after the pressure drops once again to about 100 microns. On completion of the first stage of our process, a titanium sesquioxide product substantially free from other oxides of titanium is obtained which may be reacted with a further amount of carbon to produce titanium monoxide.

Titanium sesquioxide produced in the manner described is then reacted with an equimolar quantity of elemental carbon to reduce the sesquioxide to substantially pure titanium monoxide. As described hereinbefore, the carbon required for the reduction of the sesquioxide may advantageously be incorporated in the reaction mixture when it is first introduced into the reaction vessel so that the second stage of the process may be carried out on completion of the first stage without necessitating removal of the reactants from the vessel. The titanium sesquioxide and carbon are heated together in the inert atmosphere to a temperature within the range of about 1500° to 1800° C., and preferably within the range of about 1700 to 1750° C. When the reactants reach the aforesaid temperature range, carbon monoxide is again evolved therefrom in copious quantities and again the pressure within the reaction vessel rises. The active vacuum pumping and the heating are continued until the pressure once again drops to below about 100 microns of mercury. The reaction mass is thereafter maintained within the aforesaid elevated temperature range for at least 45 minutes to insure completion of the reaction. The power is then shut off to allow the reaction mass to cool to about 200° C. while still under vacuum, whereupon the vacuum is broken and the mass cooled to room temperature. The resulting titanium monoxide product thus recovered is substantially free from other oxides of titanium. If ilmenite was used as a starting material, the titanium monoxide product may be crushed to permit separation of metallic iron therefrom.

The following examples are illustrative but not limitative of our invention:

Example I

A reaction mixture was prepared by mixing 1600 parts by weight of pigment grade titanium dioxide with 240 parts of minus 325 mesh petroleum coke which had been previously purified by calcining to a temperature of about 2500° F. After thorough mixing, the titanium dioxide and carbon were tamped into a graphite container fitted with a sheet of molybdenum covering the bottom thereof. Holes about one-quarter inch in diameter, and spaced approximately one inch apart, were then pierced through the mass from top to bottom about the entire circumference to allow evolved gas to escape. The charged graphite container was placed in an induction furnace fitted with a high speed vacuum pump capable of establishing a pressure of about 50 microns of mercury at room temperature. The furnace was sealed and the pump was operated until a reduced pressure of this order was established, whereupon heating of the furnace and of the reactants therein was commenced. After about 60 minutes the temperature of the reactants reached approximately 1150° C. at which temperature level they were held throughout the first stage of the process. The pressure within the furnace began to rise when the temperature reached about 1000° C. and, in spite of continuous active vacuum pumping, reached a peak of about one-half an atmosphere at the height of the reaction at the aforesaid temperature level of about 1150° C. As the reduction of titanium dioxide to titanium sesquioxide neared completion, the pressure gradually fell to approximately 100 microns due to gradual cessation of carbon monoxide evolution. To insure completion of the reaction, however, the reactants were held at the aforesaid temperature level for an additional 60 minutes while maintaining vacuum conditions.

On thus completing this first stage of the process, the temperature of the reactants was raised to about 1725° C. At about 1500° C. the pressure started to rise once more and, in spite of continuous vacuum pumping, reached a peak of somewhat less than one atmosphere as the temperature levelled off at 1725° C. The reaction vessel was held at this temperature level for about 45 minutes after the pressure once again dropped to about 100 microns to make certain that all parts of the reaction mass were uniformly heated and that the reaction had progressed to virtual completion. After the final holding period, the heating power was shut off and the reaction residue was allowed to cool under active vacuum pumping conditions until the temperature reachd about 200° C. The vacuum pump was then shut off and the furnace allowed to cool to room temperature. The reaction product removed from the crucible comprised 1275 parts by weight of a product having a light golden brown color. The interior of this product was highly crystalline. By chemical analysis the product was found to contain 74.8% titanium, and X-ray analysis of the product established that its structure was exactly that of titanium monoxide.

Example II

A reaction mixture was prepared composed of 1440 parts by weight of titanium sequioxide substantially free from other oxides of titanium and 120 parts by weight of calcined petroleum coke. Both the titanium sesquioxide and the coke were in the form of minus 325 mesh powder and, after thorough mixing, were tamped into a graphite crucible having a sheet moylbdenum liner covering the bottom thereof. Gas-escape holes were pierced in the mass of the reactants and the crucible was placed in the induction furnace used in Example I. The vacuum pump was started and pumping was continued until the pressure within the furnace was lowered to about 50 microns of mercury. Thereupon heating of the furnace was commenced and the temperature thereof raised to the level of about 1725° C. while continuing the active vacuum pumping. The pressure within the reaction vessel began to rise as the temperature reached about 1500° C. and the rise became quite pronounced as the temperature leveled off at 1725° C. The heating was continued to maintain the reaction temperature at the aforesaid level for about 45 minutes after the pressure dropped once again to about 50 microns, thus insuring completion of the reaction. After allowing the reaction vessel to cool under substantially the same conditions as in Example I, approximately 1275 parts by weight of a light golden brown product was recovered which was shown by chemical and X-ray analysis to be substantially pure titanium monoxide.

Example III

A reaction mixture was prepared by intimately mixing 3040 parts by weight of ilmenite containing 52.6% $TiO_2$ purified by the usual methods of beneficiation and in the form of minus 325 mesh powder with 480 parts by weight of minus 325 mesh calcined petroleum coke. The reactant mixture was tamped into a graphite crucible as before and was placed in an induction furnace fitted with a high speed vacuum pump. The furnace was evacuated until the pressure was lowered to about 100 microns of mercury and thereupon the reaction mass was heated to a temperature of about 1150° C. While the temperature was maintained at this level, the pressure rose appreciably and then fell again to about 100 microns, thus indicating completion of the reduction of the ilmenite to titanium sesquioxide and metallic iron. The reaction mass was held at 1150° C. for about 45 minutes after the pressure had dropped again to below 100 microns to insure substantial completion of the first reactions. The temperature of the reactants was then raised to about 1725° C. and was maintained at this level until the usual rise and subsequent drop in pressure indicated completion of the second stage of the process. Again the reaction mass was held at the elevated temperature of about 1725° C. for about 45 minutes after the pressure had fallen below about 100 microns to insure completion of the reaction. The reaction vessel was then allowed to cool to about 200° C. while continuing vacuum pumping, whereupon the pumping was stopped and the reaction mass was allowed to cool to room temperature. The reaction product was removed from the crucible and crushed to minus 325 mesh. After magnetic separation of the iron from the balance of the reaction residue, 1200 parts by weight of a light golden brown product was obtained which, on chemical and X-ray analysis, was shown to be substantially pure titanium monoxide.

As will be seen from the foregoing description of the practice of our invention, titanium dioxide may be reduced with elemental carbon to produce a titanium monoxide product that is substantially free from other oxides of titanium. Such a substantially pure titanium monoxide product is a valuable article of commerce, particularly useful in the production of metallic titanium by electrolytic processes in which the ultimate purity of the titanium metal produced depends to a large extent upon the purity of the starting materials employed.

We claim:

1. The method of producing titanium monoxide from titanium dioxide by reduction with elemental carbon which comprises forming an intimate mixture of titanium dioxide with at least one-half mol but not more than one mol of elemental carbon per mol of titanium dioxide, heating the mixture to a reaction temperature within the range of about 1100° to 1200° C., removing the evolved carbon monoxide from the reaction zone substantially as rapidly as it is formed whereby the partial pressure of carbon monoxide is maintained dynamically at less than one atmosphere, maintaining said reaction temperature and said reduced partial pressure of carbon monoxide until said evolution of carbon monoxide substantially ceases, whereby titanium sesquioxide is formed substantially free from other oxides of titanium, thereafter heating an intimate mixture of the resulting titanium sesquioxide with an equimolar quantity of elemental carbon to a reaction temperature within the range of about 1500° to 1800° C., removing evolved carbon monoxide from the reaction zone substantially as rapidly as it is formed whereby the partial pressure of carbon monoxide is maintained dynamically at less than one atmosphere, maintaining said reaction temperature and said reduced partial pressure of carbon monoxide until the evolution of carbon monoxide substantially ceases, and recovering the resulting titanium monoxide product.

2. The method of producing titanium monoxide from titanium dioxide by reduction with elemental carbon which comprises forming in intimate mixture of titanium dioxide with at least one-half mol but not more than one mol of elemental carbon per mol of titanium dioxide, heating the mixture to a reaction temperature within the range of about 1100° to 1200° C., removing the evolved carbon monoxide from the reaction zone substantially as rapidly as it is formed whereby the partial pressure of carbon monoxide is maintained dynamically at less than one atmosphere, maintaining said reaction temperature and said reduced partial pressure of carbon monoxide until said evolution of carbon monoxide substantially ceases, whereby titanium sesquioxide is formed substantially free from other oxides of titanium, thereafter heating an intimate mixture of the resulting titanium sesquioxide with an equimolar quantity of elemental carbon to a reaction temperature within the range of about 1700° to 1750° C., removing evolved carbon monoxide from the reaction zone substantially as rapidly as it is formed whereby the partial pressure of carbon monoxide is maintained dynamically at less than one atmosphere, maintaining said reaction temperature and said reduced partial pressure of carbon monoxide until the evolution of carbon monoxide substantially ceases, and recovering the resulting titanium monoxide product.

3. The method of producing titanium monoxide from titanium dioxide by reduction with elemental carbon which comprises forming an intimate mixture of titanium dioxide with at least one-half mol but not more than one mol of elemental carbon per mol of titanium dioxide, said elemental carbon being selected from the group consisting of lamp black and petroleum coke and having a particle size of minus 325 mesh, heating the mixture to a reaction temperature within the range of about 1100° to 1200° C., removing the evolved carbon monoxide from the reaction zone substantially as rapidly as it is formed whereby the partial pressure of carbon monoxide is maintained dynamically at less than one atmosphere, maintaining said reaction temperature and said reduced partial pressure of carbon monoxide until said evolution of carbon monoxide substantially ceases, whereby titanium sesquioxide is formed substantially free from other oxides of titanium, thereafter heating an intimate mixture of the resulting titanium sesquioxide with an equimolar quantity of elemental carbon to a reaction temperature within the range of about 1500° to 1800° C., removing evolved carbon monoxide from the reaction zone substantially as rapidly as it is formed whereby the partial pressure of carbon monoxide is maintained dynamically at less than one atmosphere, maintaining said reaction temperature and said reduced partial pressure of carbon monoxide until the evolution of carbon monoxide substantially ceases, and recovering the resulting titanium monoxide product.

4. The method of producing titanium monoxide from titanium dioxide by reduction with elemental carbon which comprises forming an intimate mixture of pigment grade titanium dioxide with at least one-half mol but not more than one mol of elemental carbon per mol of titanium dioxide, said elemental carbon being selected from the group consisting of lamp black and petroleum coke calcined at a temperature of at least about 1300° C., heating the mixture to a reaction temperature within the range of about 1100° to 1200° C., removing the evolved carbon monoxide from the reaction zone substantially as rapidly as it is formed whereby the partial pressure of carbon monoxide is maintained dynamically at less than one atmosphere, maintaining said reaction temperature and said reduced partial pressure of carbon monoxide until said evolution of carbon monoxide substantially ceases, whereby titanium sesquioxide is formed substantially free from other oxides of titanium, thereafter heating an intimate mixture of the resulting titanium sesquioxide with an equimolar quantity of said elemental carbon to a reaction temperature within the range of of about 1700° to 1750° C., removing evolved carbon monoxide from the reaction zone substantially as rapidly as it is formed whereby the partial pressure of carbon monoxide is maintained dynamically at less than one atmosphere, maintaining said reaction temperature and said reduced partial pressure of carbon monoxide until the evolution of carbon monoxide substantially ceases, and recovering the resulting titanium monoxide product.

5. The method of producing titanium monoxide from titanium dioxide by reduction with elemental carbon which comprises forming an intimate mixture of titanium dioxide with elemental carbon in the amount of one mol of carbon per mol of titanium dioxide, heating the mixture in a reaction vessel to a reaction temperature within the range of about 1100° to 1200° C., while maintaining the atmosphere within the reaction vessel below a pressure of about 100 microns of mercury by active vacuum pumping, maintaining said reaction temperature until evolution of carbon monoxide substantially ceases, whereby titanium sesquioxide is formed substantially free from other oxides of titanium, thereafter heating the mixture of the resulting titanium sesquioxide with elemental carbon to a reaction temperature within the range of about 1500° to 1800° C., removing evolved carbon monoxide from the reaction zone substantially as rapidly as it is formed whereby the partial pressure of carbon monoxide is maintained dynamically at less than one atmosphere, maintaining said reaction temperature until the evolution of carbon monoxide substantially ceases, and recovering the resulting titanium monoxide product.

6. The method of producing titanium monoxide from ilmenite by reduction with elemental carbon which comprises forming an intimate mixture of finely divided ilmenite with at least one-half mol but not more than one mol of elemental carbon per mol of titanium dioxide in said ilmenite and sufficient carbon to reduce the iron oxide in said ilmenite, heating the mixture to a reaction temperature within the range of about 1100° to 1200° C., removing the evolved carbon monoxide from the reaction zone substantially as rapidly as it is formed whereby the partial pressure of the carbon monoxide is maintained dynamically at less than one atmosphere, maintaining said reaction temperature and said reduced partial pressure of carbon monoxide until said evolution of carbon monoxide substantially ceases, whereby titanium sesquioxide is formed substantially free from other oxides of titanium, thereafter heating an intimate mixture of the resulting reduction product with a quantity of elemental carbon equimolar to said titanium sesquioxide in said reduction product to a reaction temperature within the range of about 1700 to 1750° C., removing evolved carbon monoxide from the reaction zone substantially as rapidly as it is formed whereby the partial pressure of the carbon monoxide is maintained dynamically at less than one atmosphere, maintaining said reaction temperature and said reduced partial pressure of carbon monoxide until the evolution of carbon monoxide substantially ceases, crushing the reaction product, magnetically separating an iron fraction and recovering the remaining substantially pure titanium monoxide product.

No references cited.